(No Model.) 3 Sheets—Sheet 1.
W. HARTMANN & J. L. THOMSON.
LEATHER SKIVING MACHINE.
No. 527,424. Patented Oct. 16, 1894.
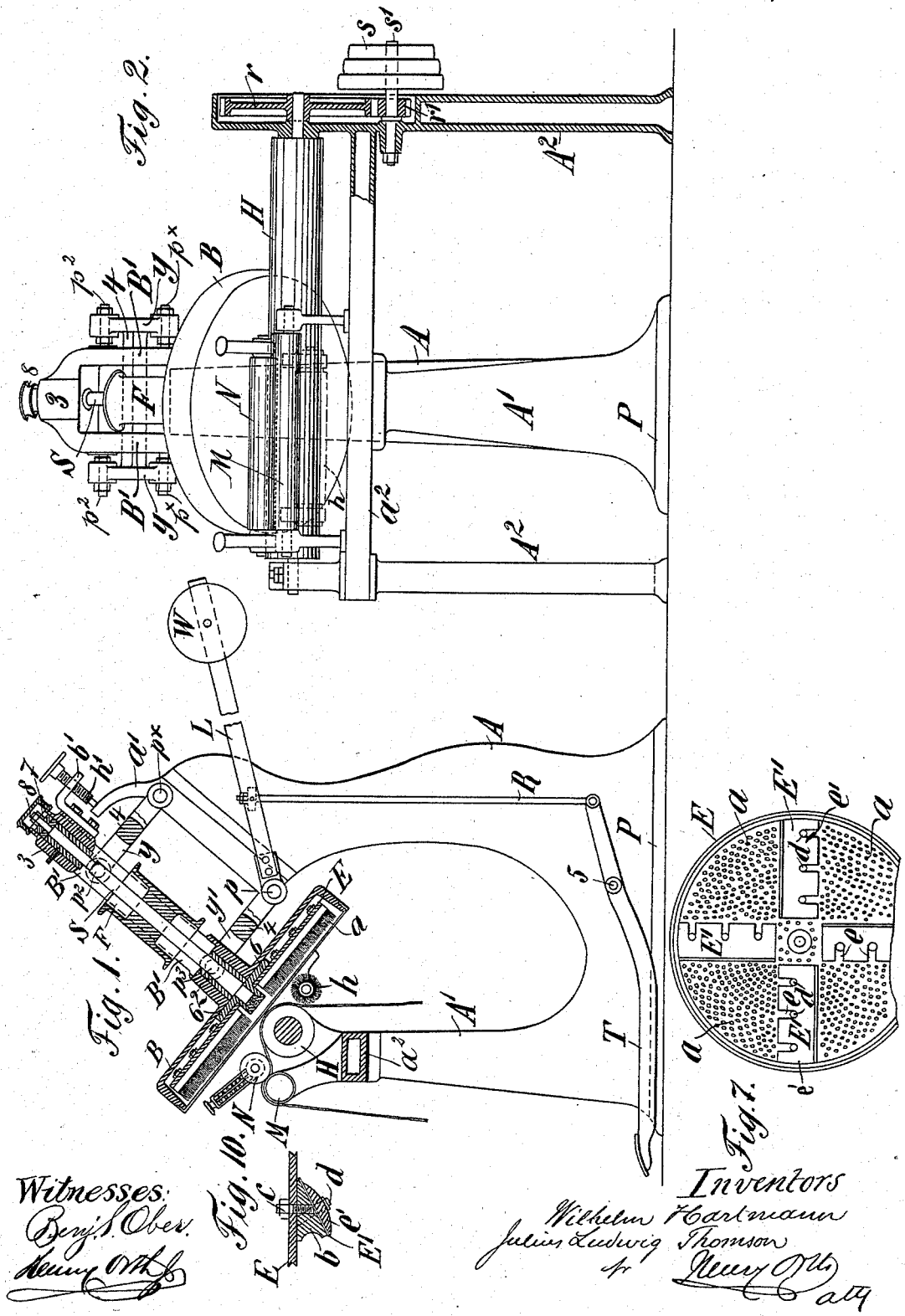
Witnesses:
Benj. S. Ober
Henry Orth Jr.
Inventors
Wilhelm Hartmann
Julius Ludwig Thomson
by Henry Orth
atty (No Model.) 3 Sheets—Sheet 2.
W. HARTMANN & J. L. THOMSON.
LEATHER SKIVING MACHINE.
No. 527,424. Patented Oct. 16, 1894.
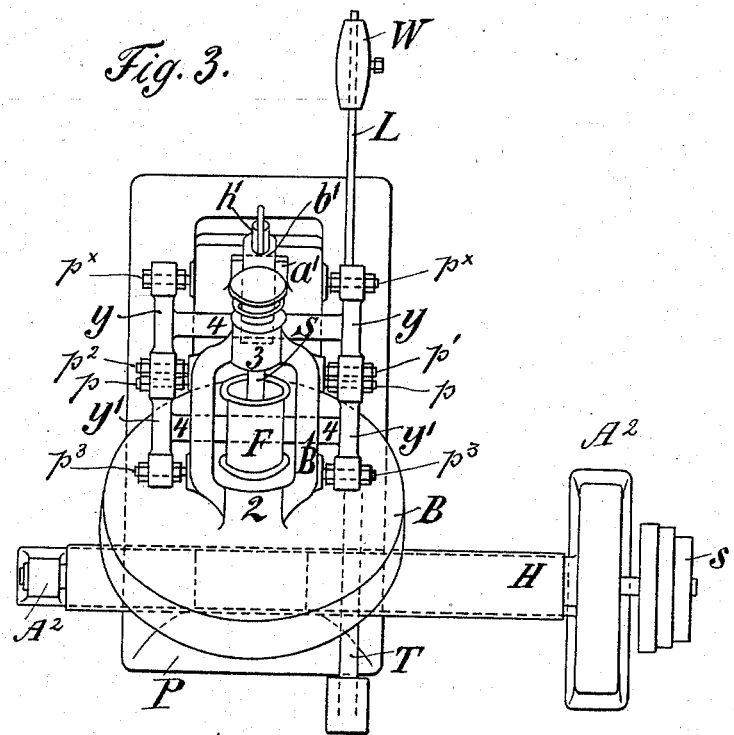
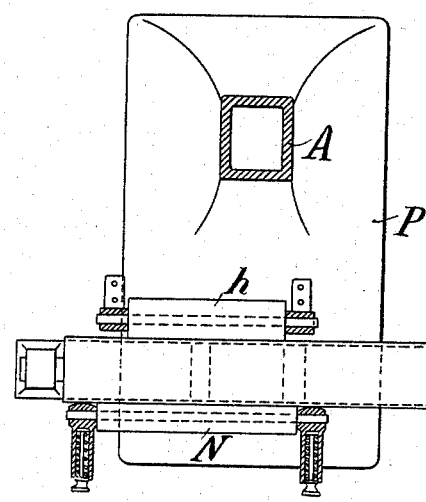
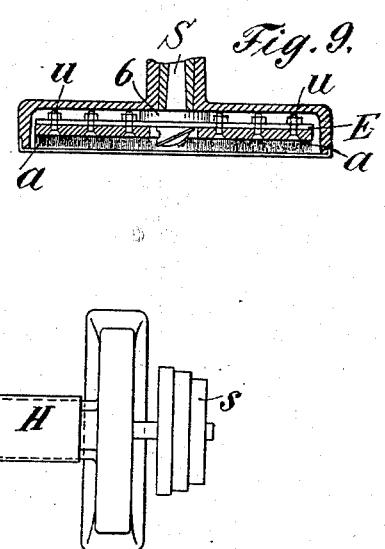
Witnesses:
Benj. S. Ober.
Inventors
Wilhelm Hartmann
Julius Ludwig Thomson

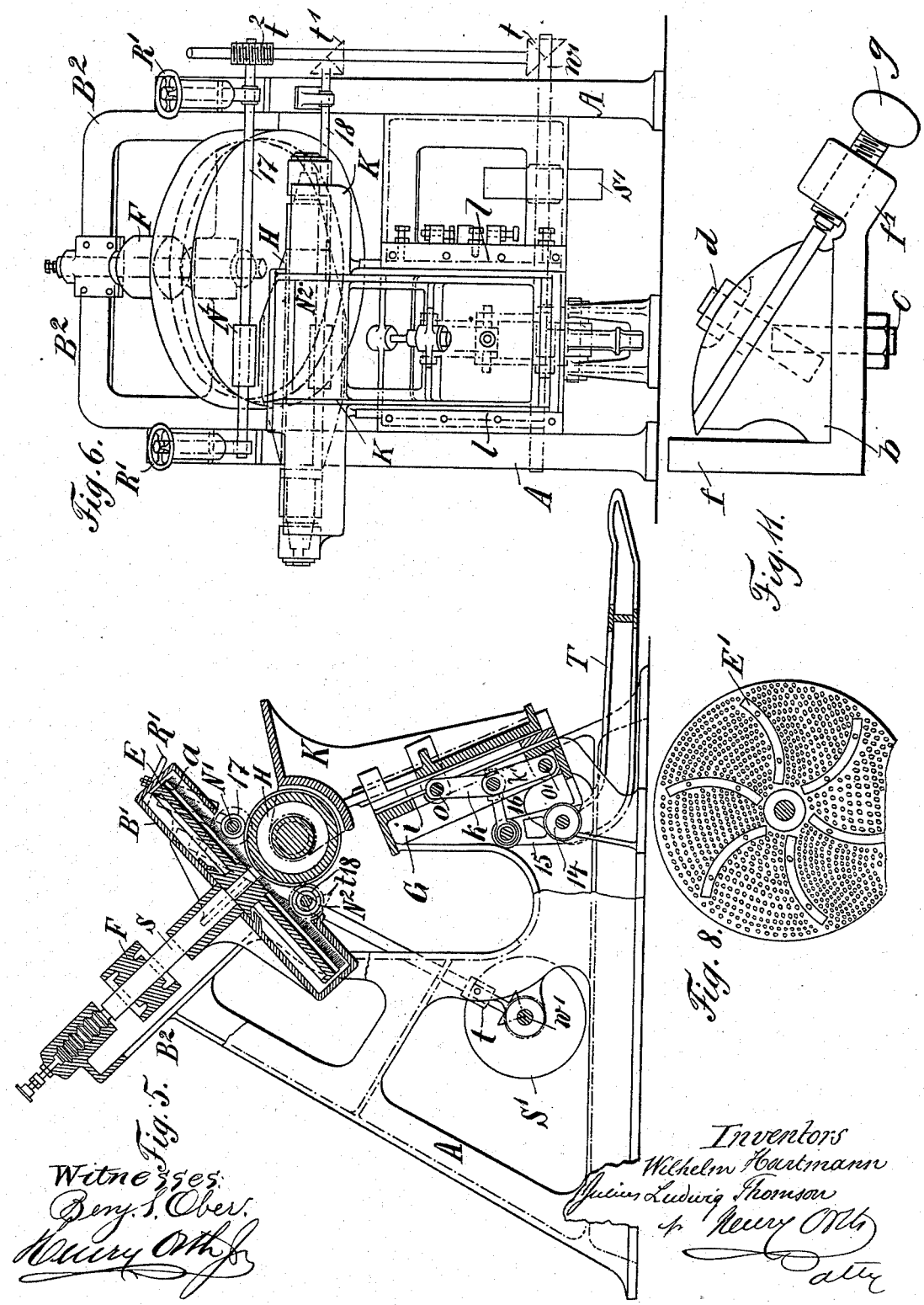

STATES PATENT OFFICE.

ing certain modifications. Figs. 7 and 8
are face views of the knife head or support,
the last named figure illustrating a modification in the construction or form of the skiving knives. Fig. 9 is a cross section of the knife head; Fig. 10, a sectional detail view illustrating the mode of securing the knives to the head; and Fig. 11 a detail view illussuitable drawing roll M. A second drawing roll N and a more or less elastic pressure roll $h$ are provided for well known purposes and have their bearings in a bracket attached to a boss B, hereinafter described.

The roll $h$ may be a blanketed roll or a brush roll the bristles of which are sufficiently stiff to exert the required pressure.

The knife carrier consists of a circular knife box or casing B, provided with an axial (No Model.)
H. V. HARTZ.
PULLEY BLOCK.
No. 527,425. Patented Oct. 16, 1894.
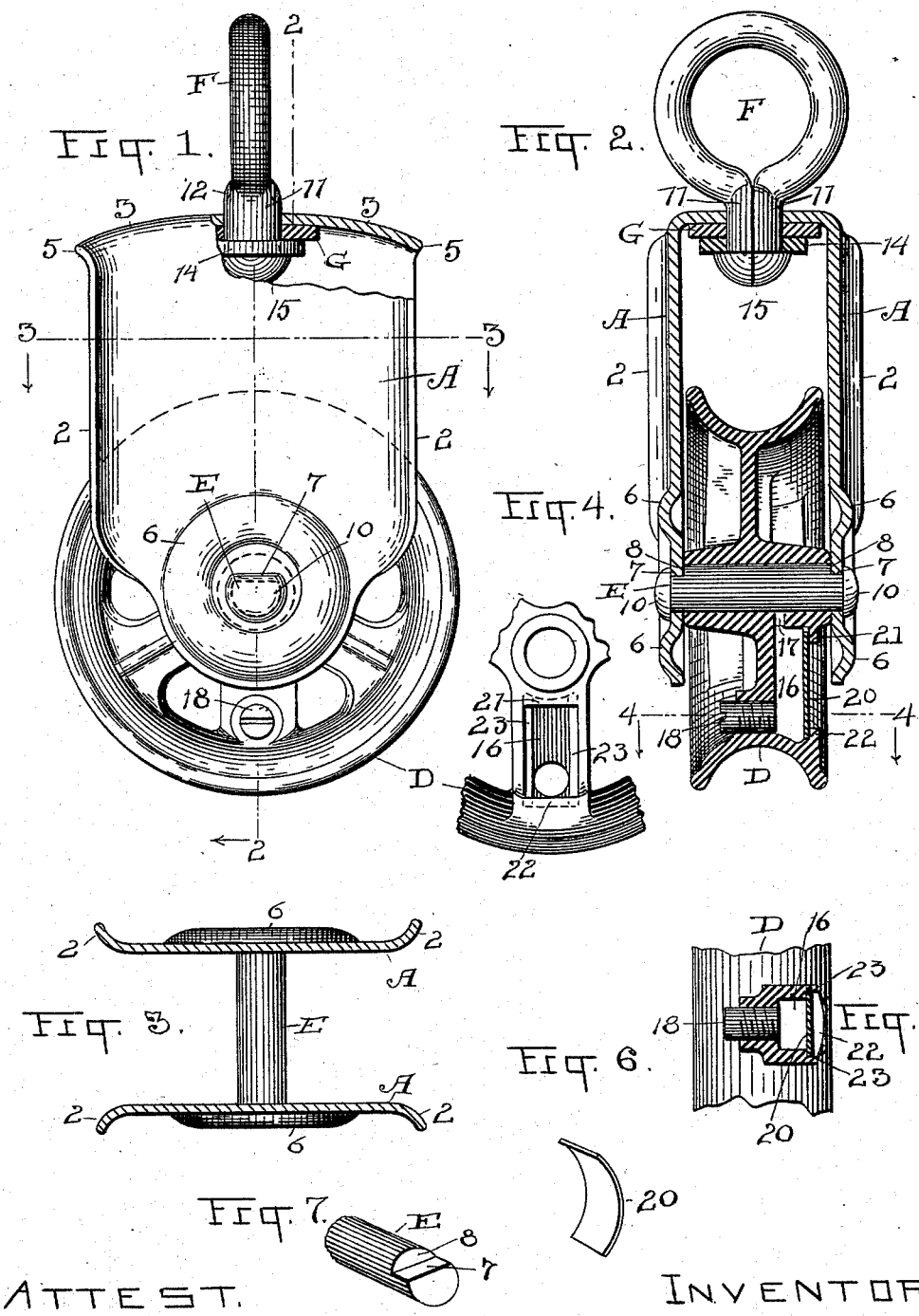
ATTEST.
R. B. Moser.
G. L. Schaffer.
INVENTOR.
Henry V. Hartz
BY H. J. Fisher.
ATTORNEY.